United States Patent [19]

van Huis

[11] 4,008,690
[45] Feb. 22, 1977

[54] POULTRY CAGE SYSTEM WITH POULTRY REMOVAL

[75] Inventor: Robert L. van Huis, Zeeland, Mich.

[73] Assignee: U.S. Industrties, Inc., New York, N.Y.

[22] Filed: Sept. 11, 1974

[21] Appl. No.: 504,968

[52] U.S. Cl. .................................. 119/82; 119/17; 119/22

[51] Int. Cl.[2] ...................................... A01K 29/00

[58] Field of Search ................. 119/17, 18, 16, 12, 119/19, 20, 21, 22, 82, 48, 49, 50; 198/185, 20 T, 121

[56] References Cited

UNITED STATES PATENTS

| | | | |
|---|---|---|---|
| 2,183,320 | 12/1939 | Grasberger | 119/50 |
| 3,718,118 | 2/1973 | Bibler | 119/82 |
| 3,722,477 | 3/1973 | Weldy et al. | 119/82 |
| 3,796,189 | 3/1974 | Blondeel | 119/18 |

Primary Examiner—Robert Peshock
Assistant Examiner—Peter K. Skiff
Attorney, Agent, or Firm—Price, Heneveld, Huizenga & Cooper

[57] ABSTRACT

A plurality of cages are arranged side-by-side on a frame in one or more horizontally spaced rows and if desired in spaced vertical tiers. The commonly facing sides of each spaced row include coverable access openings and poultry confined in the cages are removed through the openings onto a generally horizontally moving conveyor movable vertically adjacent the cage openings to each tier. Preferably, the conveyor is an endless belt type and each tier includes horizontally spaced rows vertically spaced above each other, the conveyor being movable vertically between the rows.

19 Claims, 5 Drawing Figures

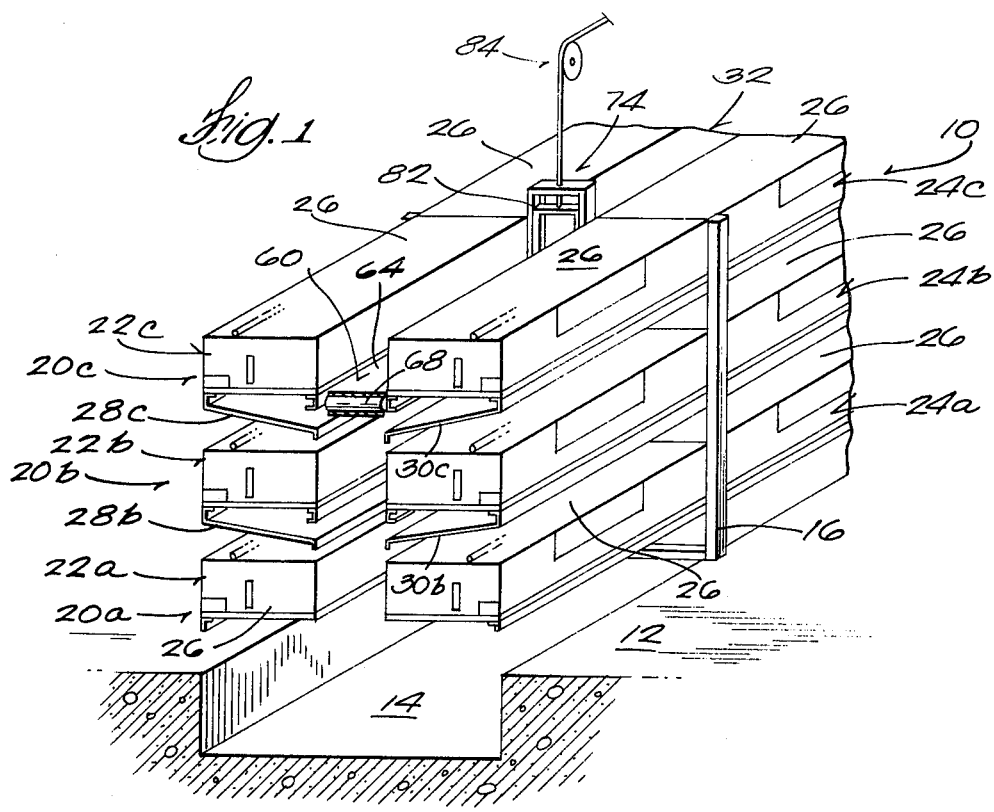
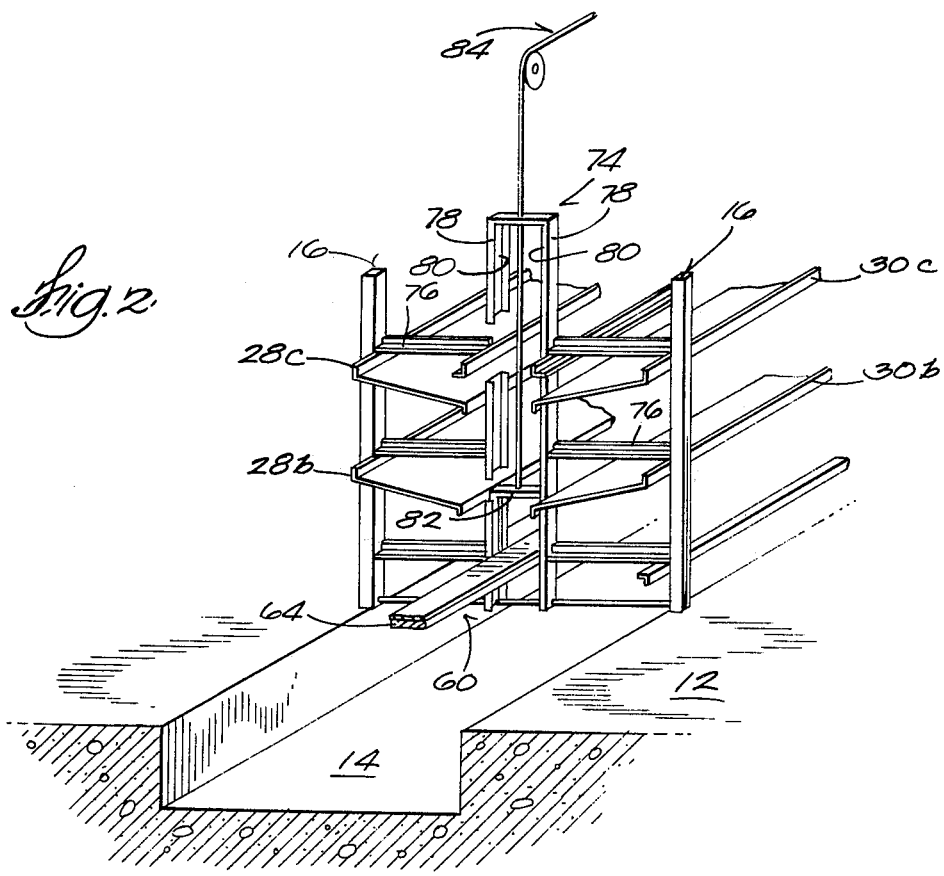

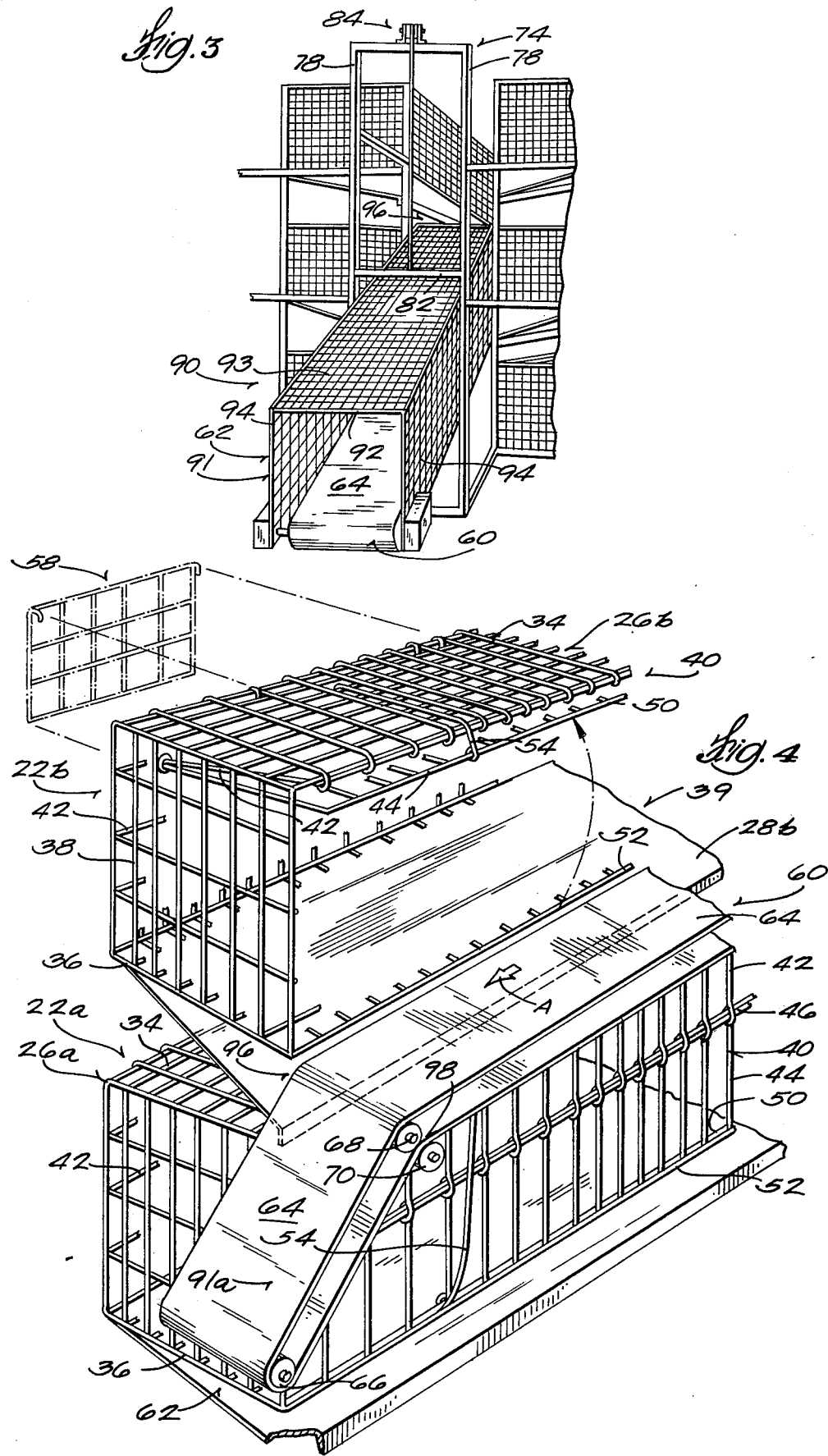

POULTRY CAGE SYSTEM WITH POULTRY REMOVAL

BACKGROUND OF THE INVENTION

This invention relates to a poultry cage system, and more particularly to a unique way of discharging poultry from cages for transportation.

In accordance with the prior art, poultry such as chickens are generally placed shortly after birth into growing cages where they are raised for a specific length of time, generally a specific number of weeks. After such time period has lapsed, they are removed from these cages for slaughter (in the case of fryers) or to special poultry houses (for layers). The particular operation of removing the poultry from their initial cages is costly and time consuming. It involves an excessive amount of labor since confined poultry tend to be nervous when an attempt to physically remove them from their cages is undertaken. Also, when poultry are raised in large numbers, they are generally housed in large complex structures comprising many many rows of cages arranged in tiers. Thus, it is extremely inconvenient for an attendant to gain immediate access to all the individual cages for removal of the poultry therefrom. While attempts have been made to urge the poultry from their cages through proper openings onto access ways which lead toward a collection point, such attempts have been unsuccessful. The poultry resist moving toward a discharge end without positive physical manipulation.

In addition to the foregoing disadvantages, it has been difficult in accordance with the prior art to simply urge the poultry to leave the cages they are confined within. Part of this difficulty is the basic nature of the poultry which as pointed out above tends toward that of excitability which results in the poultry tending to want to stay within the cage it is confined within. The configuration of prior art cages however have contributed to this difficulty by the presence of an access opening in one of the partitions of the cages with a remaining partition portion on the same side. In these cases, the poultry required to be driven through a defined opening in one side of the cage tend to seek an avenue toward the position along that panel which remains and hence blocks its passage from the cage. Thus, there is a need in this art for an improved poultry cage construction.

SUMMARY OF THE INVENTION

In accordance with the invention, live poultry are removed by urging the poultry from the cage directly onto a moving conveyor which transports the poultry to a desired collection point.

In narrower aspects of the invention, the cages are in rows arranged in vertically spaced tiers, each tier comprising a pair of horizontally spaced rows. The conveyor means is movably mounted vertically between each pair of rows to accommodate the removal of poultry at different levels with a single conveyor mechanism. Shute means at one end of the conveyor are movable at varying inclined angles to the conveyor means to deposit the poultry at a particular spot affixed by the base. Preferably, the conveyor means is an endless belt and the poultry is enclosed by the belt so that they must move to their desired location.

In other narrower aspects of the invention, the access opening in each cage through which the poultry pass is formed by a two-part panel which folds inwardly opening the entire side adjacent the conveyor means. A cable attached to the lower margin of the lower panel causes the panel to fold open upwardly and inwardly. Panels close automatically upon release of the cable by their gravitational weight.

One of the more significant advantages of the subject invention is that it provides a unique method and means for transferring poultry from their intended raising cages to a vehicle or the like without having to manually handle each bird or in the alternative prod it along a shute or the like. Instead, the birds are automatically conveyed to the vehicle or other desired locations for packing. Further, multi-tiered cage systems are easily dealt with by making the conveyor means movable vertically. The utilization of an endless conveyor belt makes for sanitary and harmless handling in that the belt does not injure the poultry and it can easily be cleaned. The unique cage doors or panels also greatly facilitate the removal of the poultry onto the conveyor further reducing prior complications.

FIG. 1 is a fragmentary, perspective view of a multi-tiered cage system in accordance with the subject invention;

FIG. 2 is a fragmentized, perspective view similar to FIG. 1 further illustrating the subject invention;

FIG. 3 is a fragmentized view of a cage system similar to that of FIGS. 1 and 2 illustrating the discharge end of the conveyor means of the subject invention;

FIG. 4 is an exploded, fragmentary view in perspective of the subject invention including a particular cage configuration.

DESCRIPTION OF THE PREFERRED EMBODIMENT

Figure 5:
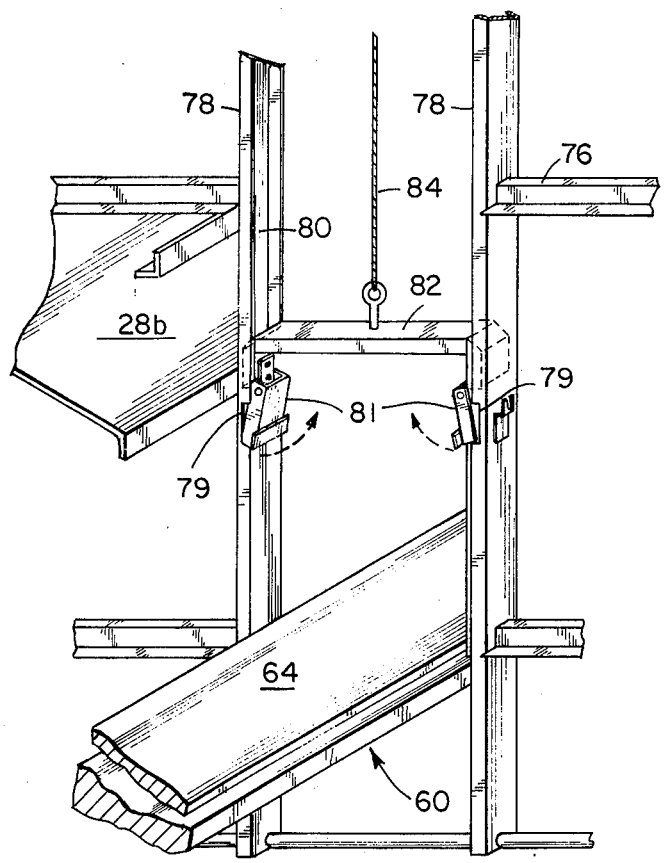
FIG. 5 is an enlarged, fragmentary, perspective view of the conveyor means including a catch mechanism of the subject invention.

Referring now to the drawings in detail, and particularly FIG. 1, a multi-tiered cage system 10 is supported on a floor 12 over a pit 14 by a frame 16. Only fragmentary portions of frame 16 are shown in the drawings. The system shown comprises three tiers, 20a, 20b and 20c each tier having a pair of facing rows of cages 22a, 24a; 22b, 24b; and 22c, 24c. The individual cages 26 are joined end-to-end forming the various rows.

The individual cages are preferably made of mesh-like panels (FIGS. 3 and 4) allowing droppings to fall through to pit 14. The rows of cages above the bottom rows each having dung collecting trays 28b, 30b and 28c, 30c which are elongated and positioned beneath them to prevent droppings from falling directly onto poultry confined in the cages therebeneath. The trays 28b, 30b and 28c, 30c are inclined inwardly and downwardly so that dung collected thereon is urged toward the center spacing 32 which extends vertically upwardly between each pair of opposing rows so that dung will fall directly into pit 14. Appropriate scraping blades (not shown) can be utilized to periodically clean or scrape each tray as well as collect dung in pit 14 for removal therefrom.

The foregoing constitutes a brief description of a particular multi-tier system, it being well within the state of this art to construct a variety of such systems with a variety of arrangements.

Referring specifically to FIG. 4, the end cages 26a and 26b are illustrated respectively of rows 22a and 22b. The cages are identical comprising top and bottom panels 34, 36; spaced end panels 38, 38 (only one being shown) and front and rear panels 40, 42. The front panel 40 or a portion thereof is designed to provide an opening when desired to permit poultry confined within the cages 26 to be removed from the cage or remove themselves from the cage.

Front panel 40 is comprised of an upper portion 42 and a lower portion 44 hinged relative each other about an axis 46 whereby they are foldable relative each other between a closed position illustrated in FIG. 4 with respect to page 26a wherein the two portions 42 and 44 are suspended vertically in essentially the same plane forming a flat front panel and an open position wherein they are folded up against each other in essentially overlapping planes as illustrated by cage 26b. In the open position, the entire front portion of the cage is open permitting poultry therein to freely exit the cage.

Without restraint, panel 40 is designed to extend vertically into the closed position by its gravitational weight with the bottom marginal stringer 50 being captured behind the outer marginal stringer 52 of bottom panel 36. The two panel portions 42 and 44 are designed not to pivot relative each other in the opposite direction when they are in the vertical closed positions so that poultry confined within the cage which bodily move against the panel in its closed position are firmly locked therein.

Front panel 40 may be easily opened by providing a wire cable 54 attached at one end to the bottom marginal stringer 50 and threaded appropriately through front panel 40 and top panel 34. By pulling on cable 54, the two panel portions 42 and 44 will be folded upwardly and inwardly to open the front panel of the cage. A hook or the like (not shown) can be attached at the opposite end of cable 54 and simply looped over one of the stringers on the cage to hold the front panel 40 in its open position.

It has been found that even with the front panel entirely open, poultry confined within are not necessarily inclined to leave the cage. While objects can be asserted into the cage to prod the poultry, this is not necessarily effective and can injure the birds. A small pivotal opening panel 58 may be provided on the back panel 42 to permit the operator to manually reach in and eject the poultry out the front opening.

The poultry which are ejected out of the cages through the opening 39 defined by the movement at front panels 40 will be positioned within spacing 32 between the respective rows of cages. To convey the poultry from a position adjacent their respective cages to a distribution point for packing or otherwise, a conveyor mechanism 60 is provided to move the poultry to a discharge point 62. The conveyor mechanism 60 is illustrated in FIG. 4 as an endless belt 64 which moves endlessly about a pair of end rollers. End roller 66 is illustrated in FIG. 4 as are a pair of take-up rollers 68 and 70. The exact details of the remaining portion of the conveyor mechanism is not illustrated it being well within the skill of this art to provide an appropriate power source and take-up assembly. The upper run of belt 64 is driven in the direction of arrow A (FIG. 4) to urge the poultry toward discharge end 62. The rate of movement of conveyor belt 64 is preferably below 120 feet per minute. It has been found out that with greater speeds, the poultry thereon begin to treadmill. Also, it cannot be too fast or the poultry will be upset upon moving on to the conveyor belt which could injure them. The speed at the same time should be sufficient enough to overcome any inclination by the poultry to move under their own power in the opposite direction at a rate greater than that of the conveyor belt. Since more than one bird will be on the conveyor at one time, this is undesirous in and of itself since it could cause confusion and panic.

Since the concept of this invention is particularly adapted for a multi-tier installation, the conveyor mechanism 60 is designed to be positioned at different levels depending on which tier of cages are being emptied. Referring briefly to FIGS. 1 and 2, a support structure 16 is identified which supports the multi-tiered assembly 10. While the actual support structure itself may take on various configurations, the essential aspect is to firmly support each of the individual tiers of cages from each side. This is generally done by providing various spaced uprights and cross support structures.

With more particular reference to FIG. 2, an inner frame housing 74 is anchored to the horizontal portion 76 of frame structure 16 with several of the frame structures being spaced longitudinally along the assembly 10. The inner sub-frame is comprised of a pair of spaced vertically extending channel members 78 having inwardly opening trackways 80 in which a yoke 82 is confined for vertical movement. The conveyor mechanism 60 is anchored firmly to yoke 82 so that it can be raised or lowered in its entirety jointly with the spaced yokes sliding in the trackways 80 of the sub-frames 74. Rollers could be used to facilitate sliding movement.

The yokes 82 can be actuated by a cable-pulley arrangement 84 which raises or lowers the yokes to the desired cage levels. To insure against accidental movement of the yokes and suspended conveyor mechanism during operation, the vertical members 78 or a vertical member associated therewith can be provided with a plurality of spaced notches 79 in which a gravitationally weighted dog 81 will lock into engagement with a particular notch at a selected height to physically prevent lowering of the conveyor mechanism except upon physical removal of the weighted dog from the selected notch to permit vertical movement. Accidental movement upwards will not occur due to the weight of the conveyor mechanism itself. This catch mechanism is shown in FIG. 5.

During transportation of the poultry along conveyor mechanism 60, it may be desirable to confine the poultry within spacing 32 on the conveyor belt 64. With reference to FIG. 3, an enclosure means 90 the discharge or shute portion 91 of the conveyor mechanism 60 is illustrated having a mesh paneled roof 93 and sides 94 with the conveyor belt 64 forming the bottom. In this fashion, the poultry are prevented from flying or jumping upwardly in the spacing 32 and hence are confined strictly to movement along the conveyor belt. While the discharge portion 91 is shown having side panels 94, the significance of which will be described hereinafter, that portion of the enclosure means 90 positioned within the cage assembly itself need not have sides since the cages themselves form such sides. It is preferable however to provide the roof portion 92 which can be anchored to the sub-assembly 74 along the vertical channel members 78.

Referring now to both FIGS. 3 and 4, since the conveyor mechanism 60 is positioned at various levels, a discharge portion 91 is provided which is adjustable to different angles of inclination so that regardless of the level at which poultry are being discharged, they will be brought to a common discharge location identified by reference numeral 62. The discharge portion 91 is completely enclosed, as previously described by a top panel 92 and side panel 94. It is pivotally connected to the remaining portion of the conveyor mechanism at the termination of the cage assembly indicated generally by the reference numeral 96. The conveyor mechanism is pivotally arranged as illustrated in FIG. 4 by a pair of idler rollers 68 and 70 positioned in proximity to each other forming a nip 98 through which the lower run of the belt is set. In this fashion, the discharge belt portion 91a of conveyor mechanism 60 can be swiveled or pivoted relative the remaining portion at transition 96 depending on the level of cages being discharged.

OPERATION

Having described in detail the specific arrangement of the preferred embodiment, its operation should be readily understood. With a multi-tiered assembly 10 of the type illustrated in the drawings, and assuming it is desirous to discharge the poultry confined within the cages arranged in the second tier 20b, namely cages 26 in rows 22b and 24b, the conveyor mechanism 60 is raised by the cable pulley arrangement 84. An appropriate power supply (not shown) can be utilized. The conveyor mechanism is preferably locked into position by lock means such as that described with relation to the weighted dog mechanism. The conveyor belt 64 is then started and as will be appreciated, it flows at a horizontal level adjacent the cages in spacing 32 and at an incline at discharge 90. The attendant then simply pulls the cable 54 of each cage on the second level and latches it so that the front panels 40 are in their fully opened position. The cages need not be opened up all at once and preferably will not be to assure sufficient space on the conveyor belt for all of the poultry. Thus, cages can be opened and closed sequentially since the rate of arrival of the poultry at discharge end 90 must correspond to the help or structure located thereat to handle the birds for further transportation. Generally, most of the poultry confined within the cages will move onto the conveyor although it may be necessary to prod reticent birds. In such cases, sub-panel 58 may be opened on front panel 42 and reticent birds may be manually urged out of the cage. The poultry are then moved by the conveyor to the discharge end 90. It is recommended that the order of discharge begin with the cages in the closest proximity to discharge end 90 so that as poultry are conveyed along conveyor mechanism 60, they are not conveyed past poultry confined within adjacent cages since this will tend to excite both the poultry within the cages and on the conveyor. As each cage is emptied of course, the respective panel 40 should be closed so that as poultry are conveyed thereby, they do not have the opportunity to get off the conveyor belt into a different cage. With the panels closed in this fashion, a complete enclosure is provided both along the cages within space 32 and as previously described at the discharge end 90.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. A poultry cage system comprising, in combination: a plurality of poultry cages arranged in a row, each of said cages having means defining an access opening through which poultry confined therein can be removed, said cages including cover means movable selectively between a first position relative said opening wherein said cover means covers said opening to prevent movement of poultry therethrough and a second position wherein said cover means is removed from said opening to permit access therethrough, and a conveyor means fixably positionable along and extending the length of said row adjacent said openings for conveying poultry urged out of said cages through said openings wherein at least two tiers of cages are arranged in rows spaced vertically by a support frame, said conveyor means being supported by said support frame and movable vertically to permit selective transportation of poultry from either of said rows of cages.

2. The combination according to claim 1 wherein said conveyor means is suspended by a sub-frame supported by said support frame and movable vertically in a fixed plane adjacent one of said tiers of cages.

3. The combination according to claim 2 wherein each of said tiers of cages includes two facing rows of cages spaced horizontally from each other, said access opening being located on each of the facing panels of said facing cages, said conveyor means being positioned in said spacing.

4. The combination according to claim 1 wherein said conveyor means includes a discharge chute at one end thereof, said discharge chute being angularly inclined relative the remaining portion of said conveyor means, the angle of inclination being adjustable depending on which tier the conveyor means is located.

5. The combination according to claim 4 wherein said discharge chute includes a top and side panels extending the length of said chute preventing premature departure of said poultry conveyed therein.

6. The combination according to claim 5 wherein a plurality of said tiers are spaced vertically above each other on a support frame and said conveyor means are supported on a sub-frame movable vertically relative said support frame, said roof panel being connected to said sub-frame and movable therewith.

7. The combination according to claim 4 wherein a plurality of cages are arranged end-to-end in one or more tiers of spaced rows facing each other, said enclosure means including the spaced front portions of said spaced rows in each tier and a roof panel extending the length of said conveyor means and spaced thereabove.

8. A poultry cage system comprising, in combination: a plurality of poultry cages arranged in a row, each of said cages having means defining an access opening through which poultry confined therein can be removed, said cages including cover means movable selectively between a first position relative said opening wherein said cover means covers said opening to prevent movement of poultry therethrough and a second position wherein said cover means is removed from said opening to permit access therethrough, and a conveyor means fixably positionable along and extending the length of said row adjacent said openings for conveying poultry urged out of said cages through said openings wherein said cover means is comprised of the entire front panel of said cages, said front panel including a first and second portion pivotally hinged together and foldable relative each other between a closed position wherein said first and second portions hang vertically in the same plane covering said access opening and an open position wherein said first and second portions are folded together in accordion fashion to uncover said access opening.

9. The combination according to claim 8 wherein said first panel is positioned above said second panel and said panel portions fold inwardly and upwardly within said cage, said portions extending vertically by their gravitational weight into said closed position and including means operatively connected to said second panel and disposed externally of said cage for preventing pivotal folding movement outwardly from said cage.

10. The combination according to claim 9 wherein each of said cages include a cable connected to the bottom of said second panel portion permitting external manipulation of said panel portions, said cable means including a hook at one end adapted for cooperation with said cage means to secure said first and second panel portions in said open position.

11. The combination according to claim 9 wherein said cages include a second panel means movable between an open and closed position independent of said first panel means for permitting access into said cage.

12. A system of poultry cages arranged in vertically spaced tiers, each tier comprising a pair of spaced inwardly facing rows of cages, the front facing panel of each cage including means defining an access opening extending the entire length of said panel and removable cover means for inserting or removing poultry therefrom, said conveyor means fixably positionable adjacent all of said access openings of a tier for conveying poultry in said cages to a central collection point; and means for moving said conveyor means vertically in said spacing defined between said tiered rows of cages, from one tier to another tier whereby said conveyor is positionable adjacent the access openings of all cages of said tier.

13. A system of poultry cages arranged in vertically spaced tiers, each tier comprising a pair of spaced inwardly facing rows of cages, the front facing panel of each cage including means defining an access opening extending the entire length of said panel and removable cover means for inserting or removing poultry therefrom, and conveyor means positionable adjacent said access openings for conveying poultry in said cages to a central collection point, said conveyor means being movable vertically in said spacing defined between said tiered rows of cages wherein said cages are supported by a support frame, said conveyor means are suspended by a sub-frame supported by said support frame and movable vertically in a fixed vertical plane relative said support frame.

14. The system according to claim 13 wherein said conveyor means is an endless driven belt extending the length of said tiers, said sub-frame comprising a plurality of spaced yokes suspended by a pulley-cable means whereby said conveyor means is raised or lowered by said pulley-cable means to a desired level.

15. A system of poultry cages arranged in vertically spaced tiers, each tier comprising a pair of spaced inwardly facing rows of cages, tne front facing panel of each cage including means defining an access opening and removable cover means for inserting or removing poultry therefrom, and conveyor means positionable adjacent said access opening for conveying poultry in said cages to a central collection point, said conveyor means being movable vertically in said spacing defined between said tiered rows of cages, said cages are supported be a support frame and said conveyor means are suspended by a sub-frame movable vertically relative said support frame, said conveyor means is an endless driven belt extending the length of said tiers, said sub-frame comprising a plurality of spaced yokes suspended by a pulley cable means whereby said conveyor means is raised or lowered by said pulley cable means to a desired level, and wherein said yoke includes a catch means associated therewith and operable with a stop on said support frame to prevent accidental lowering of said conveyor means.

16. The system according to claim 15 wherein said conveyor means includes a discharge portion pivotal relative the remaining portion thereof to different angles of inclination to permit discharge of poultry conveyed along said conveyor means at a common collection point regardless of which tier of cages are being discharged.

17. The system according to claim 15 wherein enclosure means are provided for said conveyor means to prevent premature discharge of poultry being conveyed along said conveyor means.

18. The method of removing poultry from a plurality of cages arranged in a row comprising the following steps:
providing access means in said cages for removing poultry therefrom;
providing a support frame for said cages;
providing a conveyor means;
positioning and supporting said conveyor means adjacent said access means on said support frame and along the length of the row;
urging poultry confined in said cage onto said conveyor means; and
conveying poultry urged onto said conveyor means to a desired collection point.

19. The method according to claim 18 including the additional steps of:
providing a plurality of cages supported on a frame and arranged in one or more tiers spaced vertically above each other, each tier arranged into two spaced rows facing each other;
suspending said conveyor means on a sub-frame movable vertically relative said support frame within said spaced rows; and
providing means for moving said sub-frame and associated conveyor means vertically to or from desired tiers for discharging poultry therefrom.

* * * * *

UNITED STATES PATENT AND TRADEMARK OFFICE
CERTIFICATE OF CORRECTION

PATENT NO. : 4,008,690
DATED : February 22, 1977
INVENTOR(S) : Robert L. Van Huis It is certified that error appears in the above-identified patent and that said Letters Patent are hereby corrected as shown below:

Column 6, line 35:

"chute" should be --shute--.

Column 6, line 36:

"chute" should be --shute--.

Column 6, line 41:

"chute" should be --shute--.

Column 6, line 42:

"chute" should be --shute--.

Column 8, line 6:

"tne" should be --the--.

Column 8, line 14: "be" should be --by--.

Signed and Sealed this

Seventh Day of June 1977

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 4,008,690
DATED : February 22, 1977
INVENTOR(S) : Robert L. Van Huis It is certified that error appears in the above-identified patent and that said Letters Patent are hereby corrected as shown below:

Column 6, line 48:

After "support frame," insert
--and further including an enclosure means enclosing said conveyor means to prevent premature departure of poultry conveyed on said conveyor means, said enclosure means including a roof panel--.

Column 6, line 52:

After "each other," insert
--and further including an enclosure means enclosing said conveyor means to prevent premature departure of poultry conveyed on said conveyor means--.

Column 7, line 37:

"said" should be --and--.

Signed and Sealed this

Thirteenth Day of June 1978

[SEAL]

Attest:

RUTH C. MASON
Attesting Officer

DONALD W. BANNER
Commissioner of Patents and Trademarks